(12) United States Patent
Daly

(10) Patent No.: US 6,424,110 B1
(45) Date of Patent: Jul. 23, 2002

(54) ELECTRIC VEHICLE CONTROL SYSTEM

(75) Inventor: Paul D. Daly, Troy, MI (US)

(73) Assignee: Siemens VDO Automotive, Inc., Tilbury (CA)

( * ) Notice: Subject to any disclaimer, the term of this patent is extended or adjusted under 35 U.S.C. 154(b) by 0 days.

(21) Appl. No.: 09/656,809

(22) Filed: Sep. 7, 2000

Related U.S. Application Data

(60) Provisional application No. 60/152,998, filed on Sep. 9, 1999.

(51) Int. Cl.[7] .................................................. H02P 7/00
(52) U.S. Cl. ....................... 318/471; 318/434; 180/65.1; 180/65.3
(58) Field of Search ................................ 318/471, 474, 318/139, 434; 180/65.1, 65.3

(56) References Cited

U.S. PATENT DOCUMENTS

| | | | |
|---|---|---|---|
| 4,061,838 A | | 12/1977 | Jager |
| 4,090,114 A | * | 5/1978 | Thompson .................. 318/139 |
| 5,227,703 A | * | 7/1993 | Boothe et al. .............. 318/139 |
| 5,561,362 A | * | 10/1996 | Kawamura et al. ........... 320/48 |
| 5,646,852 A | * | 7/1997 | Lorenz et al. ......... 364/431.051 |
| 5,731,669 A | * | 3/1998 | Shimizu et al. ............. 318/139 |
| 5,771,475 A | * | 6/1998 | Tabata et al. .................. 701/22 |
| 5,780,981 A | * | 7/1998 | Sonntag ....................... 318/139 |
| 5,964,309 A | * | 10/1999 | Kimura et al. ............. 180/65.8 |
| 5,965,991 A | * | 10/1999 | Koike et al. ................ 318/139 |
| 6,137,250 A | * | 10/2000 | Hirano et al. ............... 318/376 |

FOREIGN PATENT DOCUMENTS

| | | |
|---|---|---|
| DE | 196 17 548 A1 | 11/1997 |
| EP | 0 771 688 A1 | 5/1997 |
| EP | 0 773 131 A1 | 5/1997 |
| JP | 09238402 | 9/1997 |

OTHER PUBLICATIONS

European Search Report mailed Jan. 26, 2001.

* cited by examiner

*Primary Examiner*—Robert E. Nappi
*Assistant Examiner*—Rina I. Duda

(57) ABSTRACT

An electric vehicle control system controls motor response based upon monitored vehicle characteristics to provide consistent vehicle performance under a variety of conditions for a given accelerator manipulation. In one example, motor temperature is monitored. As the temperature increases, the gain of a power signal provided to the motor is increased to make up for the motor's hindered performance under higher temperature conditions. Other vehicle characteristics that are taken into account include a charge level in a fuel cell or current vehicle speed and engine load.

10 Claims, 1 Drawing Sheet

ELECTRIC VEHICLE CONTROL SYSTEM

RELATED APPLICATIONS

This application claims priority to U.S. Provisional Application No. 60/152,998, which was filed on Sep. 9, 1999.

BACKGROUND OF THE INVENTION

This invention generally relates to electric vehicles. More particularly, this invention relates to controlling a motor response in an electric vehicle based upon vehicle characteristics.

Conventional gasoline powered vehicles are designed to provide some consistency in motor response to manual manipulation of an accelerator pedal. The driver prefers to experience the same vehicle performance or motor response given the same pedal actuation. This is possible regardless of the level of fuel in the fuel tank or the temperature of the engine, provided that each is within an operable range.

More recently, electrically powered vehicles, or electric vehicles as they are commonly known, have been introduced. One drawback associated with electric vehicles is that the design does not automatically lend itself to providing a driver with a consistent motor response to a given accelerator actuation. For example, at initial start up, the electric motor temperature typically is lower than after the vehicle has been driven for some time. It is known that electric motors typically are unable to perform at the same level as the motor temperature increases. Motor performance typically is hindered by the motor's ability to dissipate heat. Therefore, a driver typically experiences a more robust motor response to a given accelerator manipulation at vehicle start up compared to later after the vehicle has been driven for some time.

Another factor that hinders consistent motor response in an electric vehicle is the charge level in a fuel cell. Reduced charge levels can result in reduced motor performance even though there is enough power available to drive the vehicle.

There is a need for an improved control strategy to control the motor response in an electric vehicle so that power consumption is better managed and the driver experiences a more consistent motor response to a given actuation of the accelerator. This invention provides a system and method for controlling an electric vehicle motor response based upon vehicle characteristics such as motor temperature or fuel cell charge level.

SUMMARY OF THE INVENTION

In general terms, this invention is a system and method for controlling motor response in an electric vehicle that has a motor and a manually operable accelerator. The method of this invention includes several steps. First a vehicle characteristic, such as motor temperature, is monitored. The maximum power output available based upon the vehicle characteristic is determined. The motor response to a manipulation of the accelerator is adjusted based upon the determined maximum power. The adjustment to the motor response preferably is made to compensate for differences in motor performance as may be caused by the current state of the vehicle characteristic, such as motor temperature.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
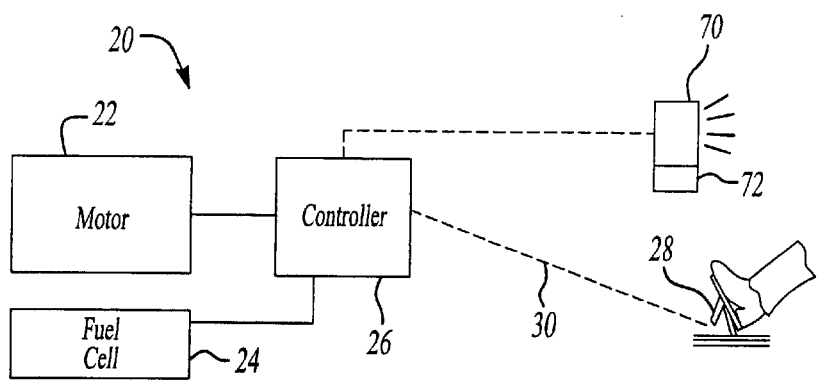
FIG. 1 diagrammatically illustrates an electric vehicle system designed according to this invention.

Selected portions of an electric vehicle system 20 are illustrated schematically in FIG. 1. The illustrated system includes various known devices that are operative to propel a vehicle such as an electric motor 22. A fuel cell 24 provides power to the motor. A controller 26 provides command signals to the motor to control the motor operation responsive to a driver manipulation of an accelerator 28. Signal communication between the controller 26 and the accelerator 28 is schematically shown at 30.

The controller 26 preferably controls the motor response of the motor 22 to a given manipulation of the accelerator 28 so that the driver experiences consistent vehicle performance under different vehicle conditions. In one example, the controller 26 alters the gain associated with a signal provided to power the motor so that consistent motor response is achieved.

The controller preferably monitors a plurality of vehicle characteristics that may have an effect on motor performance or the maximum amount of power output available under given conditions. Example vehicle characteristics include the temperature of the motor 22, a charge level of the fuel cell 24 and current vehicle speed. Other characteristics or conditions that are determined to have an effect on motor power output are preferably also monitored using a system designed according to this invention.

In one example there is a gain associated with manipulation of the accelerator 28, which is increased as the temperature of the motor 22 increases. In another example the charge level of the fuel cell 24 is monitored and the motor response is increased as the charge level decreases. In another example, the gain associated with manipulation of the accelerator is increased as the determined charge level of the fuel cell 24 decreases.

For discussion purposes, the example of the motor temperature will be discussed in this specification. It is known that electric motor performance is limited by the ability to dissipate heat in the motor windings (and in some cases the rotor). Those skilled in the art who have the benefit of this description will be able to use other vehicle characteristics, alone or in combination, to control motor response in a manner similar to the described use of temperature information.

Figure 2A:
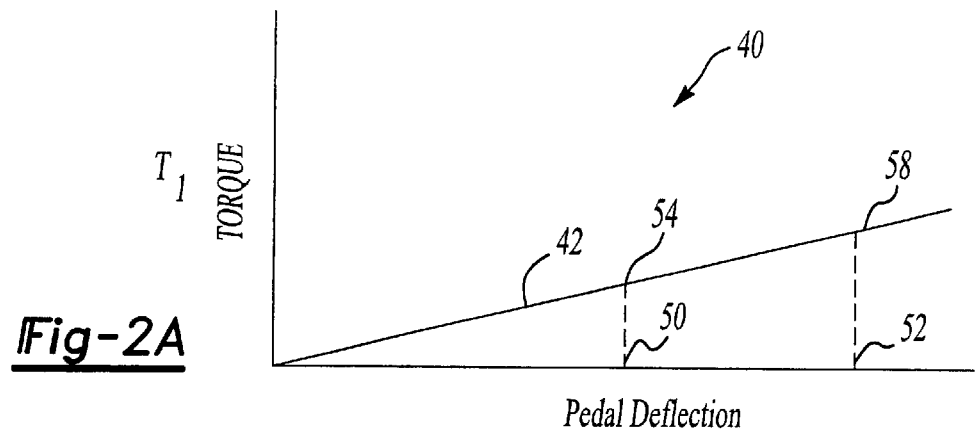
FIG. 2a graphically illustrates a feature of this invention.
Figure 2B:
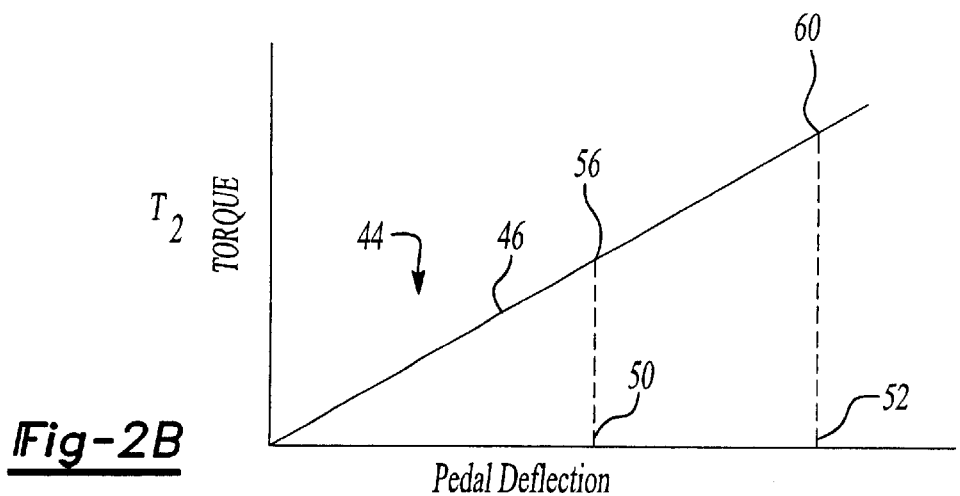
FIG. 2b graphically illustrates the feature of FIG. 2a under different conditions.

FIG. 2a shows a graphical plot 40 of a motor power signal curve 42 at a first motor temperature. For example, the temperature in FIG. 2a is a relatively cool temperature at or near vehicle start up. FIG. 2b shows a plot 44 of the motor power signal 46 at a second motor temperature that is higher than the first temperature, which would occur after the motor has been running for some time. As can be appreciated from the drawings, the power signal at the second temperature is higher than that at the first temperature for some levels of accelerator manipulation. For example two accelerator pedal positions 50 and 52 are shown in each plot 40 and 44. At the first temperature, the power signal 42 has a magnitude at 54 when the accelerator is in the position 50. A higher signal value at 56 is provided at the second temperature. The same is true comparing the signal magnitudes at 58 and 60 for an accelerator position 52. The plots of the power signal shows the adjustment made dependant on the monitored motor temperature.

The controller 26 preferably is programmed or provided with a suitable look up table so that it adjusts the motor power signal, given the monitored characteristic. That way, the motor response is controlled in relation to the monitored temperature or other vehicle characteristic. The motor response or actual power output preferably is the same for the signals 42 and 46, respectively. The controller 26 controls the signal level to the motor 22 to control the motor response to be consistent for a given accelerator manipulation regardless of motor temperature.

A system designed according to this invention preferably also maximizes power usage in an electric vehicle by controlling the motor response based on current vehicle characteristics. Under some conditions, such as a lower motor temperature, a higher power output is available. The controller preferably is programmed to provide an indication to the driver that additional power is available. An indicator 70 provides a visible indication of the additional available power in one example. In another example, an audible signal or a combination of visible and audible feedback is provided to the driver. The indicator 70 preferably provides information such as the availability of additional power along with an amount of time within which it will be available under the current vehicle conditions.

A driver input 72 preferably is included that allows the driver to communicate with the controller 26 to obtain a modified motor response based on the availability of additional power or to conserve energy within the fuel cell 24. In the illustrated example the input 72 is separate from the accelerator 28. In another example, the accelerator 28 can be manipulated to communicate a desire for modified motor response.

The preceding description is exemplary rather than limiting in nature. Variations and modifications to the disclosed embodiments may become apparent to those skilled in the art that do not necessary depart from the spirit or purview of this invention. The scope of legal protection given to this invention can only be determined by the following claims.

I claim:

1. A method of controlling motor response in an electrically powered vehicle having a motor and a manually operable accelerator, comprising the steps of:

monitoring a temperature of the motor;

determining a maximum available power output based upon the current motor temperature; and increasing the motor response to manipulation of the accelerator as the determined heat increases.

2. A method of controlling motor response in an electrically powered vehicle having a motor and a manually operable accelerator, comprising the steps of:

monitoring a temperature of the motor;

determining a maximum available power output based upon the current motor temperature; and adjusting a motor response to manipulation of the accelerator based upon the determining maximum power by increasing a gain of a motor control signal as the determined heat increases, wherein the motor control signal corresponds to a manipulation of the accelerator.

3. A method of controlling motor response in an electrically powered vehicle having a motor and a manually operable accelerator, comprising the steps of:

monitoring a temperature of the motor;

determining a maximum available power output based upon the current motor temperature;

adjusting a motor response to manipulation of the accelerator based upon the determined maximum power; and determining a first response level for a manipulation of the accelerator when the motor heat is at a first temperature and determining an adjustment to the motor response necessary to obtain the first response level for the same manipulation of the accelerator when the motor temperature is at a second temperature.

4. A method of controlling motor response in an electrically powered vehicle leaving a motor and a manually operable accelerator, comprising the steps of:

monitoring a temperature of the motor;

determining a maximum available power output based upon the current motor temperature; and determining a charge level of a fuel cell that provides electrical energy to the motor and increasing the motor response as the charge level decreases.

5. An electric vehicle power control system, comprising:

an electric motor;

a manually operable accelerator; and a controller that controls a response of the motor to a manipulation of the accelerator, wherein the controller monitors a temperature of the motor and increases the motor response to manipulation of the accelerator based upon the determined temperature increasing.

6. The system of claim 5, including a fuel cell that provides electrical energy to the motor and wherein the controller increases the motor response as a charge level in the fuel cell decreases.

7. The system of claim 5, including an indicator for a driver of the vehicle that indicates a condition where the controller can increase the motor response responsive to a manual input from the driver.

8. The system of claim 7, including an input switch that is manually operable by the driver to request an increased motor response.

9. The system of claim 7, wherein the indicator includes an audible signal.

10. The system of claim 7, wherein the indicator includes a visible indication.

* * * * *